United States Patent
Hwang

(10) Patent No.: US 6,614,937 B1
(45) Date of Patent: Sep. 2, 2003

(54) COMPRESSION CIRCUIT FOR QUICKLY PROCESSING TWO-DIMENSIONAL IMAGE DATA

(75) Inventor: Bar-Chung Hwang, Taoyuan (TW)

(73) Assignee: Winbond Electronics Corp., Hsinchu (TW)

( * ) Notice: Subject to any disclaimer, the term of this patent is extended or adjusted under 35 U.S.C. 154(b) by 581 days.

(21) Appl. No.: 09/599,033

(22) Filed: Jun. 20, 2000

(30) Foreign Application Priority Data

Nov. 24, 1999 (TW) ........................................ 88120511 A

(51) Int. Cl.[7] ................................................ G06K 9/36
(52) U.S. Cl. ...................................................... 382/238
(58) Field of Search ................................. 382/232–253; 341/63, 67, 51, 78, 106, 107; 348/384.1, 394.1, 395.1, 398.1, 400.1–404.1, 407.1–416.1, 424.2, 430.1–431.1; 375/240, 240.01, 240.02, 240.1, 240.11, 240.23; 358/426.01, 426.13, 426.14, 426.15, 426.16; 708/203, 307, 308, 317, 400–405

(56) References Cited

U.S. PATENT DOCUMENTS

| | | | | |
|---|---|---|---|---|
| 3,925,780 A | * | 12/1975 | Van Voorhi | 341/63 |
| 4,622,585 A | * | 11/1986 | Reitsma | 375/240.12 |
| 4,631,750 A | * | 12/1986 | Gabriel et al. | 382/277 |
| 4,797,943 A | * | 1/1989 | Murayama et al. | 382/274 |
| 5,057,917 A | * | 10/1991 | Shalkauser et al. | 375/240.12 |
| 5,815,097 A | * | 9/1998 | Schwartz et al. | 341/51 |
| 5,984,514 A | * | 11/1999 | Greene et al. | 364/715.02 |
| 6,122,442 A | * | 9/2000 | Purcell et al. | 395/118 |
| 6,184,936 B1 | * | 2/2001 | Hu | 348/453 |
| 6,222,941 B1 | * | 4/2001 | Zandi et al. | 382/232 |
| 6,310,918 B1 | * | 10/2001 | Saha et al. | 375/240.16 |

* cited by examiner

*Primary Examiner*—Jose L. Couso
(74) *Attorney, Agent, or Firm*—Ladas & Parry

(57) ABSTRACT

A compression circuit for quick compression processing of two-dimensional image data, using a simple hardware configuration and operation to deal with the scanned two-dimensional image data quickly, and increasing the data compression ratio. Such a compression configuration for quickly processing two-dimensional image data mainly depends on the fact that the strong correlation between the upper pixel and previous pixel of the currently scanned pixel. By computing the difference between the scanned pixel and the previous and upper pixel, respectively, and using the conventional encoding method, a higher compression ratio is achieved, thereby reducing the processing time for the data compression.

9 Claims, 5 Drawing Sheets

COMPRESSION CIRCUIT FOR QUICKLY PROCESSING TWO-DIMENSIONAL IMAGE DATA

BACKGROUND OF THE INVENTION

1. Field of the Invention

The present invention relates to an image processing circuit. More specifically, the invention relates to a circuit for a quick compression processing of two-dimensional image data.

2. Description of Related Art

The two adjacent pixels in an image frame are strongly correlated with each other. When a large amount of image data produced by a scanner is transferred to a PC, the data processing of scanner is faster than the interface to the PC can handle; thus, the scanner has to stop scanning. To address this problem, a built-in compression technique for image data is necessary to reduce the amount of data and thereby increase the speed of scanning. Further, current scanner development is tending to low-cost and high-resolution. Using the Joint Photographic Experts Group (JPEG) compression technique requires a lot of memory and computation power in the scanner; thus, this technique is configured only in high-end scanners. Currently, the compression technique in low-end scanners will scan and compress the image data line by line. Using this technique does not require a lot of memory but has a low compression ratio. Hence, the scanning speed is not improved by this technique.

SUMMARY OF THE INVENTION

Accordingly, to solve the problem mentioned above, it is an object of the present invention to provide a simple configuration for quick compression of two-dimensional data. This configuration offers quick processing of two-dimensional image data from scanning.

It is another object of the present invention to provide a simple configuration for quick compression of two-dimensional data with a higher compression ratio as compared with the prior art.

The present invention achieves these objects based on the fact that there is a high correlation between the upper pixel and left pixel of a pixel to be predicted on a frame. According to this fact, a computation unit for receiving a pixel currently being scanned, a pixel from a line buffer, and a pixel from the register and divided-by-2 device performs a simple prediction computation using these received pixel data, hence obtaining a difference value between the pixels. Typically, the small difference value between the pixels represents the high correlation between the pixels. Therefore, the coding on a frame can be simplified when the correlation between the pixels is high. By utilizing the simple prediction computation and the conventional encoding process, not only the compression ratio is increased, but the compression processing time can also be reduced.

Based on the high correlation between the upper and left pixel of the pixel to be predicted on a frame, a scan line memory is used to store the values of previous scan line for computing the pixel difference. The three color components R, G, B used to form an image respectively require a scan line memory for storing the previous scan line values. A register is used to store the value of the left pixel of the pixel to be predicted on a frame. Therefore, the difference between the pixel to be predicted and the average of the upper pixel stored in the scan line memory and the left pixel stored in the register determines the correlation level. For example, a high correlation has a smaller difference.

When scanning image data, the value of the three color components R, G, B will be read in at the same time. Because the correlation between the adjacent pixels of the image data is very high due to the similar color, the invention predicts a pixel value using two pixels located on upper and left of the pixel to be predicted. The more exact the prediction, the closer to zero the value of the pixel. For example, referring to FIG. 1, the pixels on a frame are illustrated. Assume that $a_{n,n}$ is a pixel to be predicted, and the equations are as follows:

$$a_{n,n} = (a_{n-1,n}/2) + (a_{n,n-1}/2) + \Delta a_{n,n} \quad (1)$$

$$\Delta a_{n,n} = a_{n,n} - (a_{n-1,n}/2) - (a_{n,n-1}/2) \quad (2)$$

Hence, the smaller the value $\Delta a_{n,n}$, the higher compression ratio obtained by using a variable-length code.

In addition, the memory used for the line and image buffer, a computation device is used for computating the equation (2) mentioned above. The computation device comprises two divided-by-2 devices, a data read latch, a register and a three input computation unit. The divided-by-2 devices are used to output half the value of the input, i.e., the input value is divided by 2. The data read latch reads out the data positioned above the pixel to be predicted in the previous scan line from the memory line buffer. The register temporarily stores the value $a_{n,n}$ for the next process. The three input computation unit performs one addition and two subtractions as described in equation (2). As a result, the output value from the three input computation unit is the desired value $\Delta a_{n,n}$. In the value $\Delta a_{n,n}$, because a large amount of data are ignored and only the required information is kept for the image recovery, the image encoding process is quicker and the compression ratio is increased.

The present invention also provides a circuit for the quick compression processing of two-dimensional image data comprising: a memory; an address select device; a computation unit; a data write select device; and a control logic unit.

The memory includes a line buffer and an image buffer to store the pixels of a scan line and an image, respectively.

The address select device selects the address from the line buffer or image buffer for the computation. The computation unit calculates the difference between the scanned pixel and its adjacent pixel, based on the previously scanned pixel stored in the line buffer by the data write select device and the currently scanned pixel.

After the computation, the result is stored in an image buffer address which is selected by the address select device.

The control logic unit controls the access of the memory.

Accordingly, the circuit as mentioned above can perform the function of equations (1) and (2), thereby achieving the object of the present invention of quickly processing and efficiently compressing image data.

BRIEF DESCRIPTION OF THE DRAWINGS

Other objects, features, and advantages of the present invention will become apparent from the following detailed description of the preferred but non-limiting embodiment. The description is made with reference to the accompanying drawings in which.

DETAILED DESCRIPTION OF THE PREFERRED EMBODIMENT

Figures 1, 2:
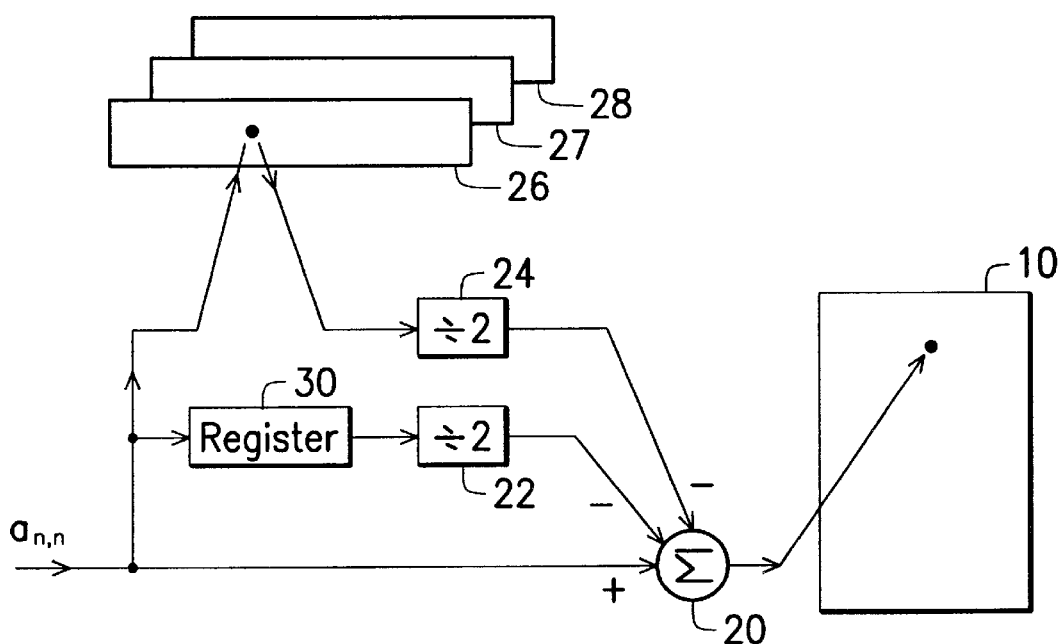
FIG. 1 is a schematic view illustrating the relationship between the scanned pixels.
FIG. 2 is a schematic view illustrating the process of quickly compressing two-dimensional image data according to the present invention.

Referring to FIG. 2, a memory located in a scanner, for example, a SRAM or DRAM, is used as an image buffer 10. Three dedicated line buffers in the memory division are used for the R, G, and B channels. In the circuit configuration of a SRAM or DRAM control and associated circuit, each channel includes a register for storing $a_{n,n-1}$, a three input computation unit 20 for computing the difference of the pixels and two divided-by-2 devices 22, 24 for obtaining half value of the current pixel by shifting a bit right and adding a negative sign bit. The line buffers 26–28 store the pixel values of the previous scan line with respect to three color components R, G, B. For example, for the pixel $a_{n,n}$ the line buffers 26–28 store the pixel value $a_{n-1,n}$ of color components R, G, B, respectively. The register 30 can delay the current pixel $a_{n,n}$ one pixel period and thereby output the previous pixel $a_{n,n-1}$. In a line scan mode scanner, these computation devices can be shared due to the line-by-line scan mode, where R,G,B signals are scanned at different times.

Figure 3:
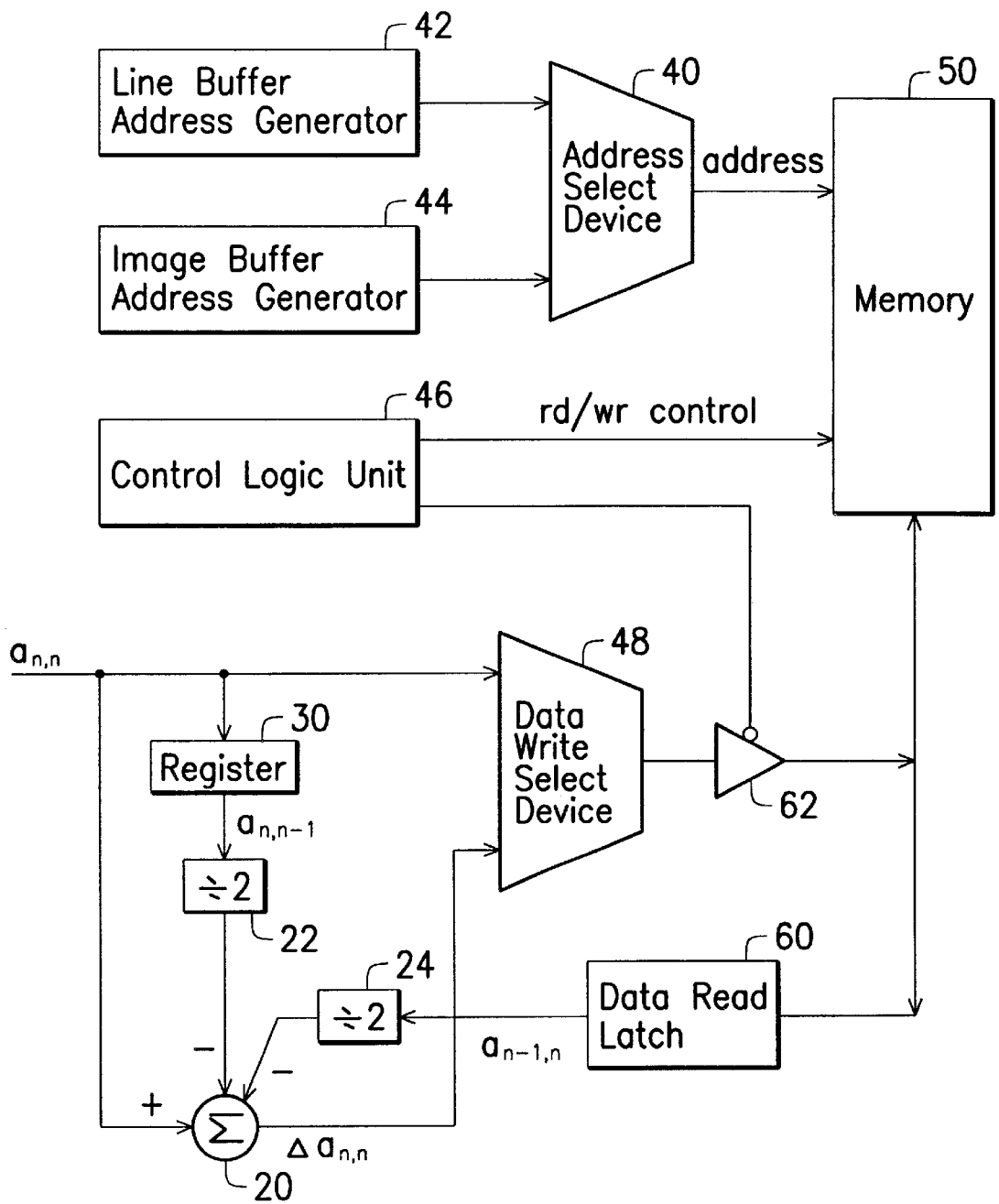
FIG. 3 is a block diagram illustrating the circuit for quickly compressing two-dimensional image data according to a first embodiment of the present invention.

Refer to FIG. 3. In the first embodiment of the present invention, the address select device 40 selects either the line buffer access or the image buffer access to be processed. The data write select device 48 selects the pixel $a_{n,n}$ to be written in the line buffer or the pixel $\Delta a_{n,n}$ in the image buffer. The entire circuit is controlled by the control logic unit 46 to read from or write into the memory 50 in which the line buffer and the image buffer are included.

To perform the write operation, the configuration of FIG. 2 is added in the data write select device 48 and the data read latch 60. First, the scanned pixel $a_{n,n}$ is concurrently inputted to the data write select device 48 and the computation unit 20. Also, the pixel $a_{n,n-1}/2$ is inputted into the computation unit 20 through the register 30 and the divided-by-2 device 22, and the pixel $a_{n-1,n}$ in the data read latch from the memory 50 is outputted to the computation unit 20 through the divided-by-2 device 24. The data write select device 48 will determine whether the pixel $a_{n,n}$ is written into the line buffer of the memory 50 or the pixel difference $\Delta a_{n,n}$ is written into the image buffer of the memory 50 according to the system timing.

For a read operation, the address generated by the line buffer address generator 42 or by the image buffer address generator 44 is inputted to the memory 50 according to the system timing, and the control logic unit 46 will output a read control signal to the memory 50 so that the memory 50 outputs the stored data according to the received address from the address generator 42 or 44.

Figure 4:
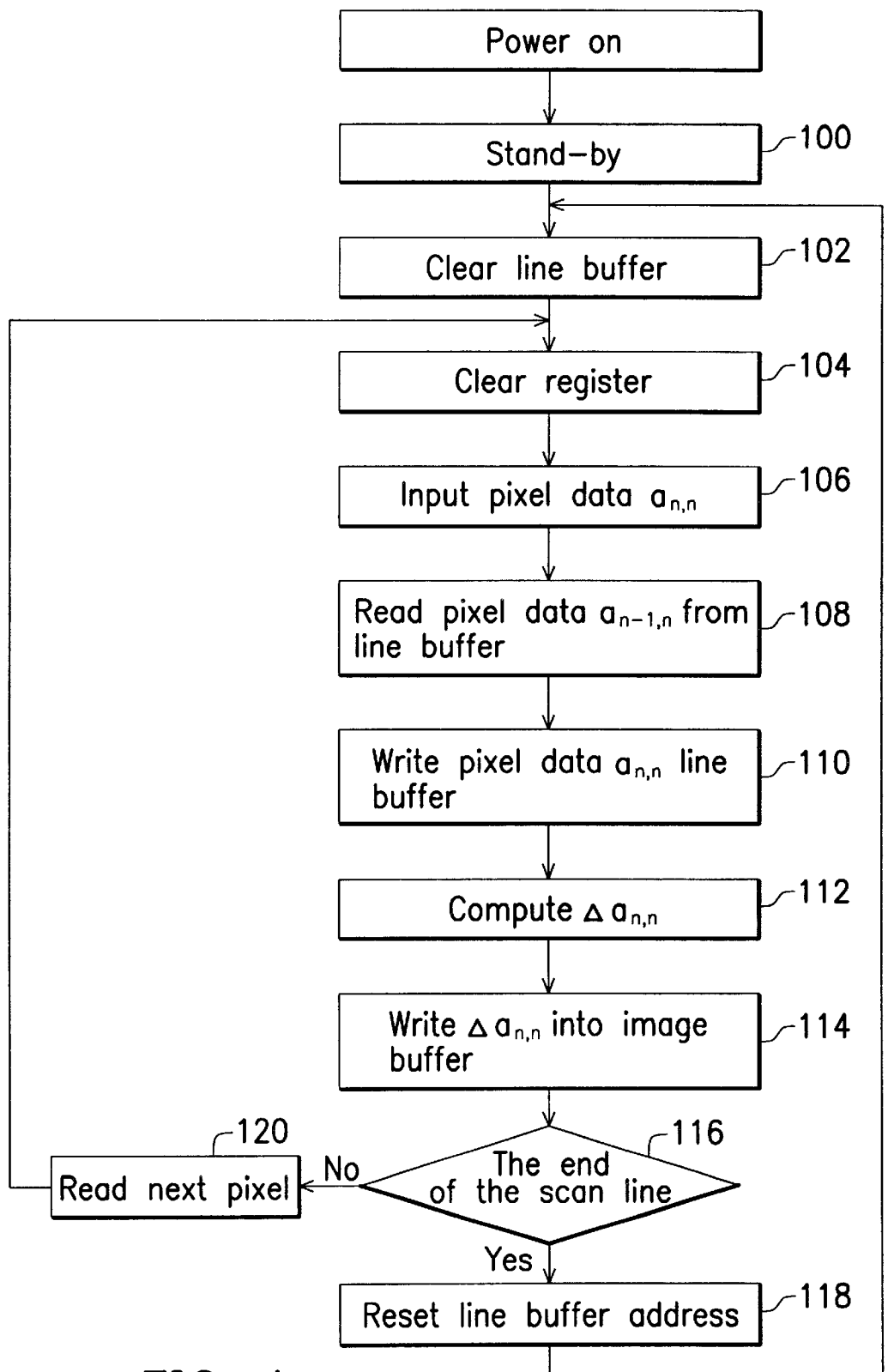
FIG. 4 is a flowchart illustrating the process of quickly compressing two-dimensional image data.

Referring to FIG. 4, the flowchart of the present invention comprises the step as follows: (i) in step 100, the system is in stand-by state after the power on; (ii) in step 102, clear the line buffer before a scan operation starts; (iii) in step 104, clear the register; (iv) in step 106, input the scanned pixel $a_{n,n}$; (v) in step 108, read the previous scan line pixel $a_{n-1,n}$ located in the previous scan line at the upper of the pixel $a_{n,n}$; (vi) in step 110, write the pixel $a_{n,n}$ into the line buffer; (vii) in step 112, compute the pixel difference $\Delta a_{n,n}$ according to the equation (2); (viii) in step 114, write the pixel difference $\Delta a_{n,n}$ into the image buffer; (ix) in step 116, check if the scan line ends; (x) in step 118, reset the content of the line buffer if yes; (xi) in step 120, read the next pixel if no.

Figure 5:
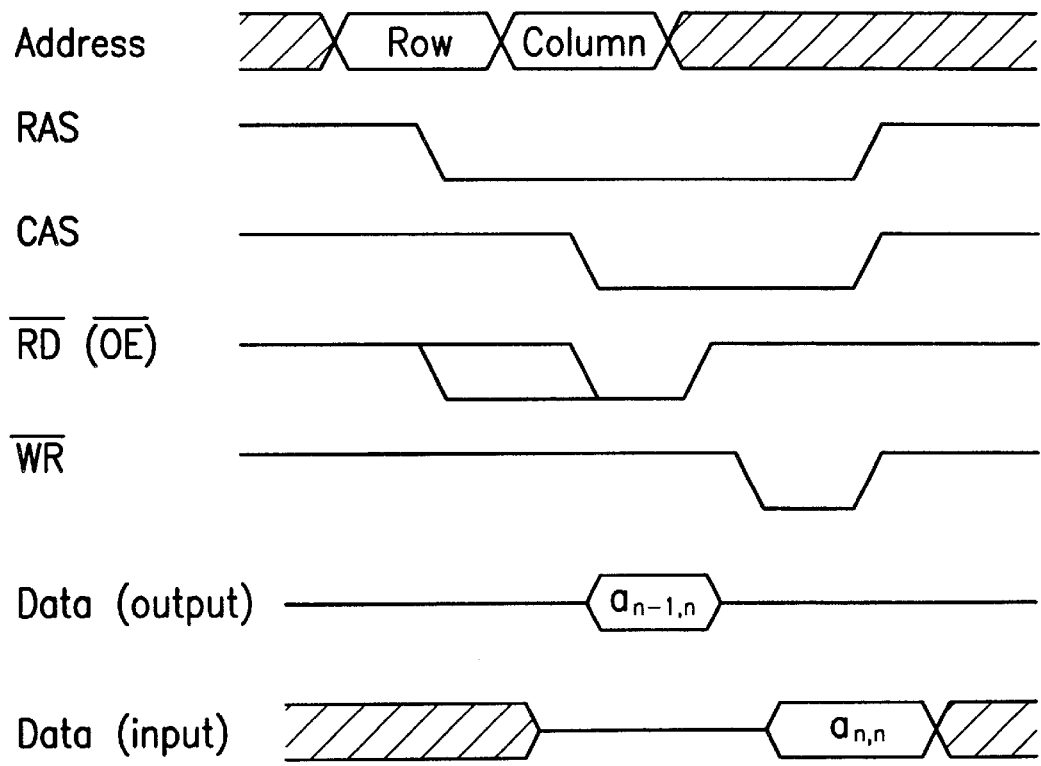
FIG. 5 illustrates the timing of the invention using a DRAM as a line buffer as an example.

Referring to FIG. 5, a memory access cycle of the present invention includes a line buffer read state, a line buffer write state, and an image buffer write state. Because a standard DRAM will offer the read modify write at the same access cycle, i.e., the read access state, the write access state, can be within the same access cycle, the pixel $a_{n-1,n}$ is read immediately following the write operation of the pixel $a_{n,n}$ at the same address while the line buffer is accessed. Therefore, by a scanner with the DRAM, the present invention uses an extra memory cycle in the line buffer access.

Figure 6:
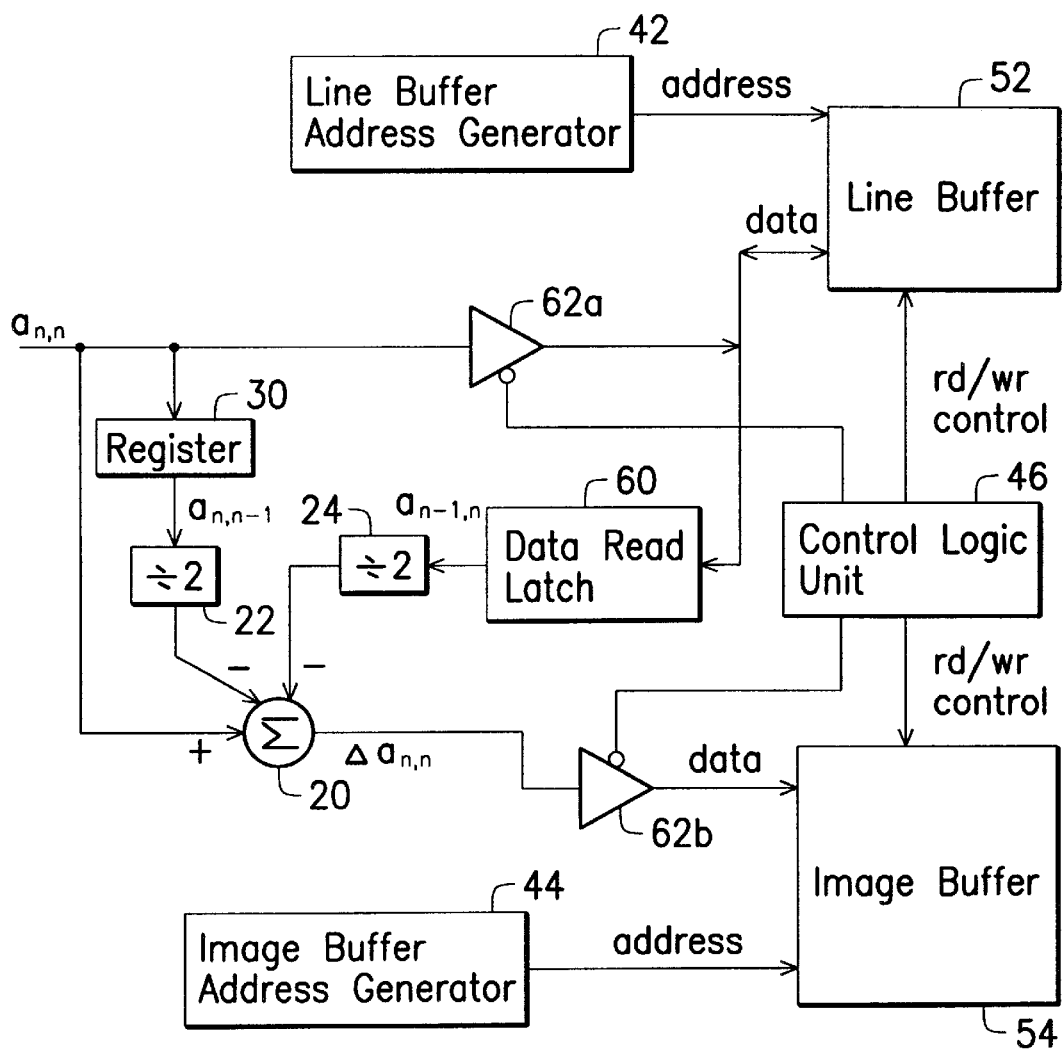
FIG. 6 is a block diagram illustrating the circuit for quickly compressing two-dimensional image data according to a second embodiment of the present invention.

Refer to FIG. 6, wherein the same devices are denoted by the same numerals shown in FIG. 3. Two memories are used in the second embodiment of FIG. 6, are used instead of both the line buffer 52 and the image buffer 54 being located in a memory as shown in FIG. 3. Thus the pixels $a_{n,n}$ and $\Delta a_{n,n}$ can be separately written into the line buffer and the image buffer. Therefore, the address select device 40 and the data write select device 48 can be omitted. Accordingly, in this embodiment, the line or image buffer for the read/write operation can be selected directly by two tri-state drivers 62a and 62b via the control of the control logic unit 46.

What is claimed is:

1. A compression circuit for a quick compression processing of two-dimensional image data, comprising:

a memory having a line buffer and an image buffer for storing the required pixel data of a prediction computation;

an address select device for selecting the input address from one of the line buffer or the image buffer;

a register for storing a currently scanned pixel data temporarily until the next pixel is input;

a divided-by-2 device for providing an output value equal to half of an input value from the register and the line buffer;

a computation unit for receiving the pixel currently being scanned, the pixel from the line buffer, and the pixel from the register and divided-by-2 device, then performing the prediction computation using the received the scanned pixel data;

a data write select device for selecting the scanned pixel data to be written into the line buffer or the result of the computation unit to be written into image buffer; and a control logic unit for controlling the read/write memory access.

2. The compression circuit of two-dimensional image data as claimed in claim 1, further comprising a line buffer address generator and a image buffer address generator, each connected to the address select device with two inputs, wherein the address select device can select an output address from the line buffer address generator or the image buffer address generator.

3. The compression circuit of two-dimensional image data as claimed in claim 1, wherein the computation unit performs the prediction computation according to the equation as follows:

$$\Delta a_{n,n} = a_{n,n} - (a_{n-1,n}/2) - (a_{n,n-1}/2)$$

where, $\Delta a_{n,n}$ denotes a predict pixel difference, $a_{n,n}$ denotes a scanned pixel data, $a_{n-1,n}$ denotes the pixel data stored in line buffer, and $a_{n,n-1}$ denotes the previous pixel data.

4. The compression circuit of two-dimensional image data as claimed in claim 2, further comprising a data read latch to read the previous scan line pixel data from the line buffer of the memory at the same position as the currently scanned pixel data.

5. A compression circuit for quick compression processing of two-dimensional image data, comprising:

- a first memory as a line buffer to store the pixel data of a scan line;
- a second memory as an image buffer to store the pixel data of an image;
- a register for storing a currently scanned pixel data temporarily until the next pixel is input;
- a divided-by-2 device for providing an output value equal to half of the input value from the register and the line buffer;
- a computation unit for receiving the pixel currently being scanned, the pixel from the line buffer, and the pixel from the register and divided-by-2 device, then performing the prediction computation using the received pixel data; and
- a control logic unit for controlling the read/write memory access.

6. The compression circuit of two-dimensional image data as claimed in claim 5, further comprising a line buffer address generator connected to the first memory, and controlled by the control logic unit to output the address of the line buffer.

7. The compression circuit of two-dimensional image data as claimed in claim 5, further comprising an image buffer address generator connected to the second memory, and controlled by the control logic unit to output the address of the image buffer.

8. The compression circuit of two-dimensional image data as claimed in claim 5, wherein the computation unit performs the computation according to the equation as follows:

$$\Delta a_{n,n} = a_{n,n} - (a_{n-1,n}/2) - (a_{n,n-1}/2)$$

where, $\Delta a_{n,n}$ denotes a predicted pixel difference, $a_{n,n}$ denotes a scanned pixel data, $a_{n-1,n}$ denotes the pixel data stored in line buffer, and $a_{n,n-1}$ denotes the previous pixel data.

9. The compression circuit of two-dimensional image data as claimed in claim 5, further comprising a data read latch to read the previous scan line pixel data from the line buffer of the memory at the same position as the currently scanned pixel data.

* * * * *